US 7,952,358 B2

(12) United States Patent
Wang et al.

(10) Patent No.: US 7,952,358 B2
(45) Date of Patent: May 31, 2011

(54) METHODS AND APPARATUS FOR DETERMINATION OF A FORMATION RESISTIVITY PROPERTY USING ECCENTERED MEASUREMENTS

(75) Inventors: Tsili Wang, Katy, TX (US); Cynthia D. Xue, Houston, TX (US); Luis M. Pelegri, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 317 days.

(21) Appl. No.: 12/188,042

(22) Filed: Aug. 7, 2008

(65) Prior Publication Data

US 2009/0102485 A1 Apr. 23, 2009

Related U.S. Application Data

(60) Provisional application No. 60/981,383, filed on Oct. 19, 2007.

(51) Int. Cl.
*G01V 3/08* (2006.01)
(52) U.S. Cl. ........................................................ 324/338
(58) Field of Classification Search ................... None
See application file for complete search history.

(56) References Cited

U.S. PATENT DOCUMENTS

| 4,837,517 | A | 6/1989 | Barber |
| 5,157,605 | A | 10/1992 | Chandler et al. |
| 5,452,761 | A | 9/1995 | Beard et al. |
| 6,147,496 | A | 11/2000 | Strack et al. |
| 6,493,632 | B1 | 12/2002 | Mollison et al. |
| 6,574,562 | B2 | 6/2003 | Tabarovsky et al. |
| 6,618,676 | B2 | 9/2003 | Kriegshauser et al. |
| 6,686,736 | B2 | 2/2004 | Schoen et al. |
| 7,336,080 | B2 | 2/2008 | Yu et al. |
| 7,408,355 | B1 * | 8/2008 | Forgang et al. ............... 324/339 |
| 2007/0170923 | A1 | 7/2007 | Forgang et al. |

OTHER PUBLICATIONS

Rabinovich et al.; "Formation Dips from Multi-Component Induction Data as an Alternative to Image Logs in Difficult Borehole Environments", Petrotech Conference, 2007, New Delhi, India, 6 sheets.

* cited by examiner

*Primary Examiner* — Jay M Patidar
(74) *Attorney, Agent, or Firm* — Mossman Kumar & Tyler PC

(57) ABSTRACT

Multi-component induction measurements are made using a resistivity logging tool in an anistropic earth formation. The X-signal (quadrature) is insensitive to borehole eccentricity. A subset of the multi-component measurements are inverted to first determine horizontal resistivities. Using the determined horizontal resistivities and another subset of the multi-component measurements, the vertical resistivities are obtained. Results of using the in-phase signals are comparable to those obtained using multifrequency focusing of quadrature signals.

22 Claims, 14 Drawing Sheets

METHODS AND APPARATUS FOR DETERMINATION OF A FORMATION RESISTIVITY PROPERTY USING ECCENTERED MEASUREMENTS

CROSS-REFERENCES TO RELATED APPLICATIONS

This application claims priority from U.S. Provisional Patent Application Ser. No. 60/981,383 filed on 19 Oct. 2007.

BACKGROUND OF THE DISCLOSURE

1. Field of the Disclosure

The present disclosure relates generally to the field of electrical logging of oil wells. More specifically, the present disclosure is a method of obtaining a measure of a parameter of a formation using a real component of an electrically induced signal in a formation.

2. Description of the Related Art

It is important to the oil and gas industry to know the nature and characteristics of the various subsurface formations penetrated by a borehole because the mere creation of a borehole (typically by drilling) usually does not provide sufficient information concerning the existence, depth location, quantity, etc., of oil and gas trapped in the formations. Various electrical techniques have been employed in the past to determine this information about the formations. One such technique commonly used is induction logging. Induction logging measures the resistivity (or its inverse, conductivity) of the formation by first inducing eddy currents to flow in the formations in response to a transmitter signal, and then measuring a phase component signal in a receiver signal generated by the presence of the eddy currents. Variations in the magnitude of the eddy currents in response to variations in formation conductivity are reflected as variations in the receiver signal. Thus, in general, the magnitude of the in-phase component (the component that is in-phase with the transmitter signal) is indicative of the conductivity of the formation.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p. 148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. No. 4,837,517; U.S. Pat. No. 5,157,605 issued to Chandler et al.; and U.S. Pat. No. 5,452,761 issued to Beard et al.

A typical electrical resistivity-measuring instrument is an electromagnetic induction well logging instrument such as described in Beard et al. The induction logging instrument described in the Beard '761 patent includes a number of receiver coils spaced at various axial distances from a transmitter coil. Alternating current is passed through the transmitter coil, which induces alternating electromagnetic fields in the earth formations. Voltages, or measurements, are induced in the receiver coils as a result of electromagnetic induction phenomena related to the alternating electromagnetic fields. A continuous record of the voltages forms curves, which are also referred to as induction logs. Induction instruments that are comprised of multiple sets of receiver coils are referred to as multi-array induction instruments. Every set of receiver coils together with the transmitter is called a subarray. A multi-array induction tool consists of numerous subarrays and acquires measurements with all the subarrays.

Voltages induced in the axially more distal receiver coils are the result of electromagnetic induction phenomena occurring in a larger volume surrounding the instrument, and the voltages induced in the axially proximal receiver coils are the result of induction phenomena occurring more proximal to the instrument. Therefore, different receiver coils see a formation layer boundary with different shoulder-bed contributions, or shoulder-bed effects. The longer-spaced receiver coils see the formation layer boundary at further distance from the borehole than the shorter-spaced receiver coils do. As a result, the logs of longer-spaced receiver coils have longer shoulder-bed effects than the logs of shorter-spaced receiver coils. The logs of all the receiver coils form a certain pattern.

A newly developed induction instrument comprises three mutually orthogonal transmitter-receiver arrays. Such a configuration makes it possible to determine both horizontal and vertical resistivities for an anisotropic formation in vertical, deviated, and horizontal boreholes. A description of the tool can be found in U.S. Pat. No. 6,147,496 to Strack, et al. The transmitters induce currents in three mutually perpendicular spatial directions and the receivers measure the corresponding magnetic fields ($H_{xx}$, $H_{yy}$, and $H_{zz}$). In this nomenclature of the field responses, the first index indicates the direction of the transmitter, the second index denotes the receiver direction. As an example, $H_{zz}$ is the magnetic field induced by a z-directed transmitter coil and measured by a z-directed receiver. The z-direction is parallel to the borehole. Included in Strack is a teaching of how measurements made at two frequencies can be combined to give the resistivity of the earth formation away from the borehole while avoiding the effects of possible invasion of borehole fluids into the formation. Other methods for processing of multicomponent induction data use a frequency focusing method in which measurements are made at several frequencies. Examples of such methods are given in U.S. Pat. No. 6,574,562 to Tabarovsky et al.

The imaginary (quadrature) component of the magnetic field is commonly used in the inversion processing methods identified above. This corresponds to the real part of the voltage. The real component of a single frequency magnetic field measurement has similar properties to the imaginary component of a dual frequency (or multi-frequency) magnetic field measurement. This has been noted in U.S. Pat. No. 7,336,080 to Yu et al., having the same assignee as the present disclosure and the contents of which are incorporated herein by reference. Yu discusses the use of the real component of the magnetic field for determination of anisotropic formation resistivity. The present disclosure addresses the use of the real component of the magnetic field in the presence of tool eccentricity effects. The term "eccentricity" refers to a situation in which the logging tool may be disposed away from the center of a borehole. This has significant effects on multicomponent measurements.

SUMMARY OF THE DISCLOSURE

One embodiment of the disclosure is a method of logging of an earth formation. The method includes positioning a logging tool in a borehole, transmitting a first magnetic field into the earth formation, receiving a second magnetic field resulting from the first magnetic field and using only a component of the second magnetic field substantially in phase with the first magnetic field to estimate a resistivity property of the earth formation, the estimate being substantially unaffected by an amount of eccentering of the logging tool.

Another embodiment of the disclosure is an apparatus for logging of an earth formation. The apparatus includes a logging tool configured to be positioned in a borehole, a transmitter configured to transmit a first magnetic field into the earth formation a receiver configured to receive a second magnetic field resulting from the first magnetic field, and a processor configured to use only a component of the second magnetic field substantially in phase with the first magnetic field to estimate a resistivity property of the earth formation, the estimate being substantially unaffected by an amount of the eccentering.

Another embodiment of the disclosure is a computer-readable medium accessible to at least one processor. The computer-readable medium includes instructions that enable the at least one processor to estimate a resistivity property of an earth formation using only a component of a second magnetic field substantially in phase with a first magnetic field transmitted into the earth formation by a logging tool in a borehole, the second magnetic field resulting from the first magnetic field. The estimate is substantially unaffected by an amount of eccentering of the logging tool.

BRIEF DESCRIPTION OF THE DRAWINGS

The present disclosure is best understood with reference to the accompanying figures in which like numerals refer to like elements and in which.

DETAILED DESCRIPTION OF THE DISCLOSURE

Figure 1:
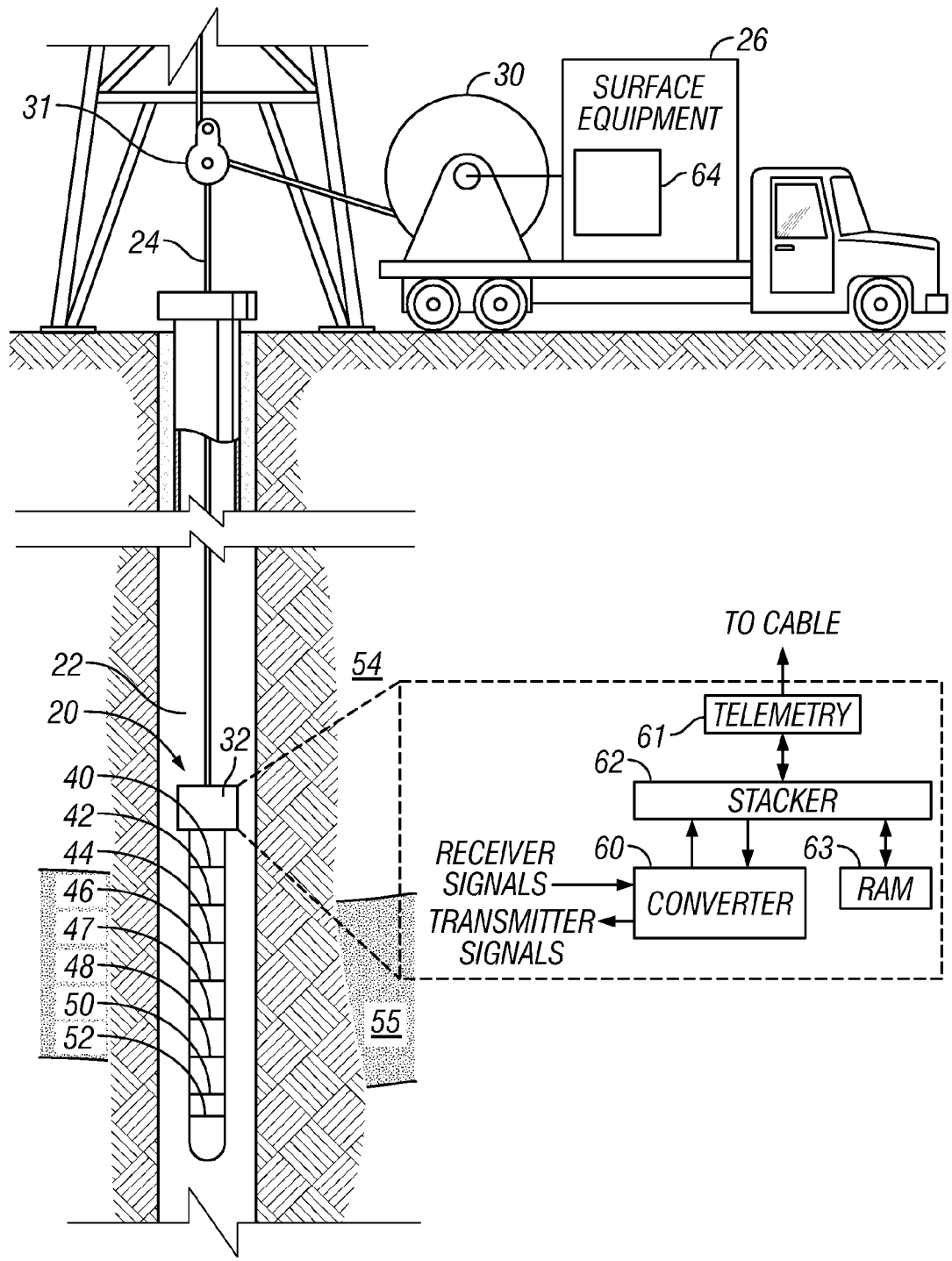
FIG. 1 is an illustration showing an induction logging tool deployed in a borehole for measuring the conductivity of the adjacent formation.

Referring now to FIG. 1, an induction logging tool 20 suitable for use with the present disclosure is shown positioned in a borehole 22 penetrating earth formations 54. The tool 20, which is suspended in the borehole 22 by means of a wireline cable 24, includes a borehole sonde 34 and an electronic circuitry section 32. The tool 20 is lowered into the borehole 22 by a cable 24, which passes over a sheave 31 located at the surface of the borehole 22. The cable 24 is typically spooled onto a drum 30. The cable 24 includes insulated electric conductors for transmitting electrical signals. The electronic circuitry section 32 of the tool 20 receives signals from the sonde section 34 to perform various analog and digital functions, as will be described later.

The sonde 34 preferably includes a plurality of coils 40-52. Coil 46 is a transmitter coil for transmitting an oscillating signal into the adjacent surrounding geological formation 54. Preferably, a square wave signal is supplied to the coil 46. However, it is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents, which flow coaxially with respect to the borehole 22. The magnitudes of the eddy currents are related to the conductivity of the surrounding formation 54. The remaining coils 40, 42, 44, 47, 48, 50 and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity that is indicative of the possibility of containing hydrocarbons may be located.

The electronic circuitry section 32 includes a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40-52 and transforming them into digitized signals for further processing by the stacker circuit 62. The analog voltage signals provided by the receiver coils 40-52 are digitally sampled according to a predetermined sampling rate in the period defined by the fundamental frequency of the transmitter signal, which in a typical embodiment is approximately 10 kHz.

The sampling is repeated over a large number of transmitter voltage signal cycles, preferably at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40-52 can then be retrieved from the RAM 63 and can be transmitted by the telemetry circuit 61 through the cable 24 to a processor 64 which forms part of the surface equipment 26, where analyses of the stacked signals can be performed. Alternatively, processing of at least part of the data could be performed downhole using a processor at a suitable location (not shown) and results of the processing telemetered uphole.

In an alternative embodiment, a processor having sufficient digital signal processing capabilities could form part of the electronic circuitry section 32. Thus, it is contemplated that the required discrete Fourier transform could be performed downhole, which would further reduce the amount of data to be transmitted to the surface.

The measured zz signal in a borehole drilled perpendicular to a formation is responsive only to the horizontal resistivity of the earth formation. This is due to the fact that the currents induced by a z-component transmitter are in a plane parallel to bedding and are not affected by the vertical resistivity of an anisotropic formation. An x- or a y-component transmitter in a borehole drilled perpendicular to a formation, on the other hand, induces currents that flow in both vertical and horizontal directions (and also at intermediate angles). Hence the xx and yy signals are responsive to both vertical and horizontal resistivities. Commonly used inversion procedures rely on the zz signal for determination of horizontal resistivity, and this determined horizontal resistivity is used for obtaining the vertical resistivity from the xx and/or yy signals. Consequently, inverted values of vertical resistivities are less accurate than inverted values of horizontal resistivities.

Figure 2:
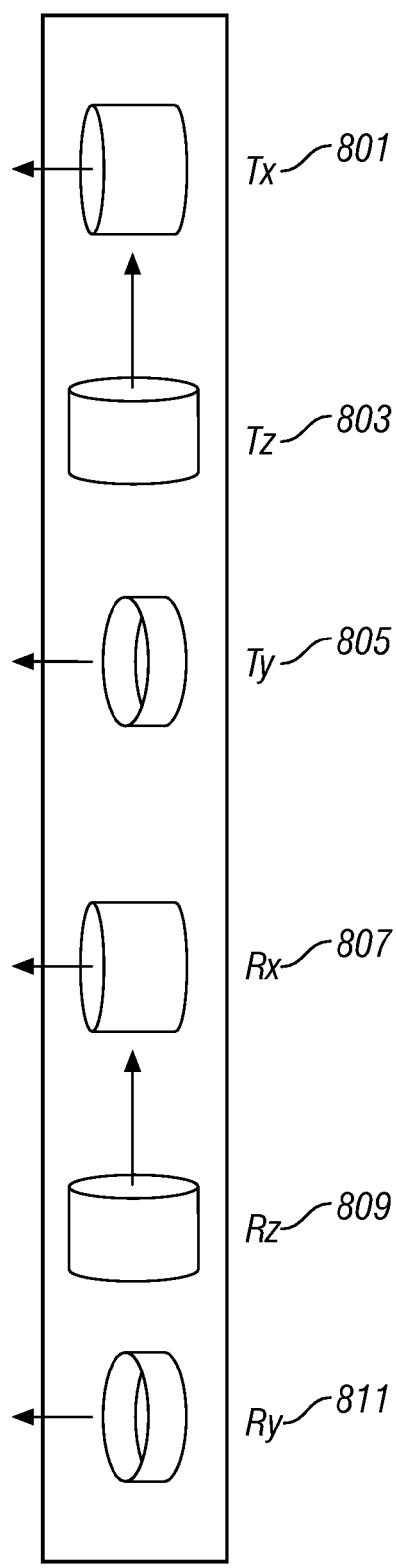
FIG. 2 (prior art) shows an arrangement of transmitter and receiver coils for making multicomponent measurements.

A suitable arrangement of transmitter and receiver coils for making multicomponent measurements is shown in U.S. Pat. No. 6,618,676 to Kriegshauser et al. and is shown in FIG. 2. Shown therein is the configuration of transmitter and receiver coils of the 3DExplorer™ induction logging instrument of Baker Hughes. Three orthogonal transmitters 801, 803 and 805 that are referred to as the $T_x$, $T_z$, and $T_y$ transmitters are shown (the z-axis is the longitudinal axis of the tool). Corresponding to the transmitters 801, 803 and 805 are associated receivers 807, 809 and 811, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used.

In FIG. 2, the transmitter and receiver coils are shown in a fixed orientation relative to the body of the logging tool. In an alternate embodiment of the disclosure, the transmitters and/or receivers may be gimbal mounted using methods known in the art.

We first discuss the theoretical background of multicomponent measurements. Given a magnetic field H at the receiver location, the voltage measured is given by $$V = -i\mu\omega M_T M_R H \quad (1),$$

where $M_T$ and $M_R$ are the transmitter and receiver coil moments, $\omega = 2\pi f$ (radian/sec) is the angular frequency, and H is the magnetic field, $$H = H^{re} + iH^{im}, \quad (2),$$

where $H^{re}$ and $H^{im}$ are the real and imaginary components of the magnetic field. Therefore, the voltage induced at the receiver coil can be written as, $$V = V_R + iV_X = \omega\mu M_T M_R \cdot H^{im} - i\omega\mu M_T M_R \cdot H^{re} \quad (3),$$

where $V_R$ is the R-signal and $V_X$ the X-signal. Mathematically, the R- and X-signals are related to each other through the Hilbert transform, $$R(f) - R(\infty) = \frac{1}{\pi}\int_{-\infty}^{\infty} \frac{V(f') - V(\infty)}{f' - f} df', \quad (4)$$

$$X(f) = -\frac{1}{\pi}\int_{-\infty}^{\infty} \frac{R(f') - V(\infty)}{f' - f} df'. \quad (5)$$

Hence, in theory, the R-signal and X-signal are not independent of each other. Knowing the R-signal at all frequencies, one can derive the X-signal and vice versa. However, in practice, both the R- and X-signals are acquired at finite and limited number of frequencies. The two signals are not fully recoverable from each other. Hence, both R- and X-signals provide useful independent information.

For a two-coil sonde, the voltage induced at the receiver coil is (Moran and Kunz, 1962)

$$V = -\frac{2M_T M_R}{4\pi L^3}(i\omega\mu)(1 - ikL)e^{ikL}, \quad (6)$$

where $M_T$ and $M_R$ are the transmitter and receiver coil moments, L is the coil spacing, and $k^2 = i\omega\mu\sigma$ is the wave number and $\sigma$ is the conductivity. If $\sigma = 0$, the voltage given by the above formula is just that due to the direct mutual coupling between transmitter and receiver. This voltage has a phase angle of 90° relative to the transmitter current. As $\sigma$ increases, the X-signal or the out-of-phase component, will decrease, while the R-signal or the in-phase component, will begin to grow. This behavior can be seen more clearly by separating the real and imaginary parts of V, expanding in powers of kL, and decomposing the above formula into the in-phase (R-) and out-of-phase (X-) signals for Z direction components, we have $$R_{zz} = -K\frac{\sigma}{L}\left(1 - \frac{2}{3}\frac{L}{\delta} + \frac{2}{15}\frac{L^3}{\delta^3} - \ldots\right), \quad (7)$$

and $$X_{zz} = K\frac{2}{\omega\mu L^3}\left(1 - \frac{2}{3}\frac{L^3}{\delta^3} + \frac{1}{2}\frac{L^4}{\delta^4} - \frac{2}{15}\frac{L^5}{\delta^5} \ldots\right), \quad (8)$$

where K is a sensitivity factor for the induction logging, $$K = \frac{(\omega\mu)^2 M_T M_R}{4\pi}, \quad (9)$$

and the quantity $\delta$ introduced here is the "skin depth", $$\delta = \sqrt{\frac{2}{\omega\mu\sigma}}.$$

If a frequency of 20 kHz is used, then $\delta$ is close to 140 inches for a formation conductivity of one mho/meter. It should be noted that $\sigma\delta^2$ is independent of conductivity; this factor is written as shown in the second equation only to make the comparison of X to R signal easier.

A bucking-coil response can be derived from the above equations by combining the responses from the main receiver at spacing L2 and the bucking coil at spacing L1, we have three coil equation as, $$R_{zz} = -K \frac{\sigma}{L_2} \begin{bmatrix} \left(1 - \frac{L_1^2}{L_2^2}\right) - \frac{2}{3}\left(\frac{L_2}{\delta} - \frac{L_1^2}{L_2^2}\frac{L_1}{\delta}\right) + \\ \frac{2}{15}\left(\frac{L_2^3}{\delta^3} - \frac{L_1^2}{L_2^2}\frac{L_1^3}{\delta^3}\right) - \ldots \end{bmatrix} \quad (10)$$

$$= -K \frac{\sigma}{L_2} \begin{bmatrix} \left(1 - \frac{L_1^2}{L_2^2}\right) - \frac{2}{3}\frac{L_2}{\delta}\left(1 - \frac{L_1^3}{L_2^3}\right) + \\ \frac{2}{15}\frac{L_2^3}{\delta^3}\left(1 - \frac{L_1^5}{L_2^5}\right) - \ldots \end{bmatrix}$$

$$X_{zz} = -K \frac{2}{\omega\mu} \frac{1}{L_2^2} \begin{bmatrix} \frac{2}{3}\frac{L_2^3}{\delta^3}\left(1 - \frac{L_1^3}{L_2^3}\right) - \frac{1}{2}\frac{L_2^4}{\delta^4}\left(1 - \frac{L_1^4}{L_2^4}\right) + \\ \frac{2}{15}\frac{L_2^5}{\delta^5}\left(1 - \frac{L_1^5}{L_2^5}\right) \ldots \end{bmatrix} \quad (11)$$

The first term of the R-signal corresponds to the skin effect-corrected response. The first term of the X-signal is similar to the second term of the R-signal. From the above expressions, apparent conductivities can be derived for the R- and X-signals. For the R-signal, the apparent conductivity is given by $$\sigma_{zz} = G_{zz}^R H_x = \frac{L_2}{K}\left[\frac{L_2^2}{L_1^2 - L_2^2}\right] R_{zz}, \quad (12)$$

where $G_{zz}^R$ is the R-signal constant, $$G_{zz}^R = \frac{4\pi L_2^3}{\omega\mu(L_2^2 - L_1^2)} = \frac{2L_2^3}{f\mu(L_2^2 - L_1^2)}$$

The apparent conductivity for the X-signal can be derived from the first term of the X-signal expression $$X_z \approx -\frac{-4K}{3\omega\mu\delta^3}\left[\left(1 - \frac{L_1^3}{L_2^3}\right)\right] \quad (13)$$

$$= \frac{-(\omega\mu)^{\frac{5}{2}}}{6\sqrt{2}\,\pi}\left[\left(1 - \frac{L_1^3}{L_2^3}\right)\right]\sigma^{\frac{3}{2}}$$

which gives $$\sigma_{zz} = G_{zz}^X X_z = \frac{1}{\omega\mu}\left(\frac{6\sqrt{2}\,\pi L_2^3}{L_2^3 - L_1^3}\right)^{\frac{2}{3}}$$

$$X_z = \frac{1}{2\pi f\mu}\left(\frac{6\sqrt{2}\,\pi L_2^3}{L_2^3 - L_1^3}\right)^{\frac{2}{3}} X_z.$$

In a similar manner, we derive the R-signal constant for the other components.

We next show illustrative examples of model simulation. The 3D forward modeling algorithm used in this study is based on the finite-element Nedelec discretization (Nedelec, 1980). The finite element method simulates the 3DEX tool on a non-uniform cylindrical grid containing (76×128×84) cells in the radial, azimuthal and vertical (r-, φ-, and z-) directions respectively. The minimum grid steps around the sensors are approximately 1 inch (2.54 cm). Grid cells up to 500 inches (12.7 m) are used near the outer (artificial) boundary of the computation domain. The linear system of equations is solved with a preconditioned Generalized Minimal Residual Method (GMRES).

The number of iterations to reach the convergence depends on the model conductivity contrast and on the frequency and transmitter coil orientation. For this study, the maximum number of iterations was a few hundred. Because the finite element grid often does not conform to model boundaries (e.g., borehole and bed boundaries), boundaries are approximated by "staircase" profile. We first conducted a 3D numerical simulation for a uniform, anisotropic formation with $R_h$=2.5 Ω-m and $R_v$=5 Ω-m. To simulate a strong tool eccentricity effect, we assume a 12.25 in. (31.1 cm) diameter borehole with highly conductive mud ($R_m$=0.05 Ω-m). The relative dip angle is θ=45°. We let the eccentricity angle Φ to be 30°, that is, the tool is offset from the borehole axis in a direction 30° from the X-axis. The tool offset E varies from 0.5 in. to 2 in (1.27 cm to 5.08 cm). Because the 3DEX tool measures data at ten different frequencies $f_1 \ldots f10$, from 20 kHZ to 220 kHZ, we demonstrate the tool response only at the lowest (20 kHz) and highest (220 kHz) frequencies.

Figure 3:
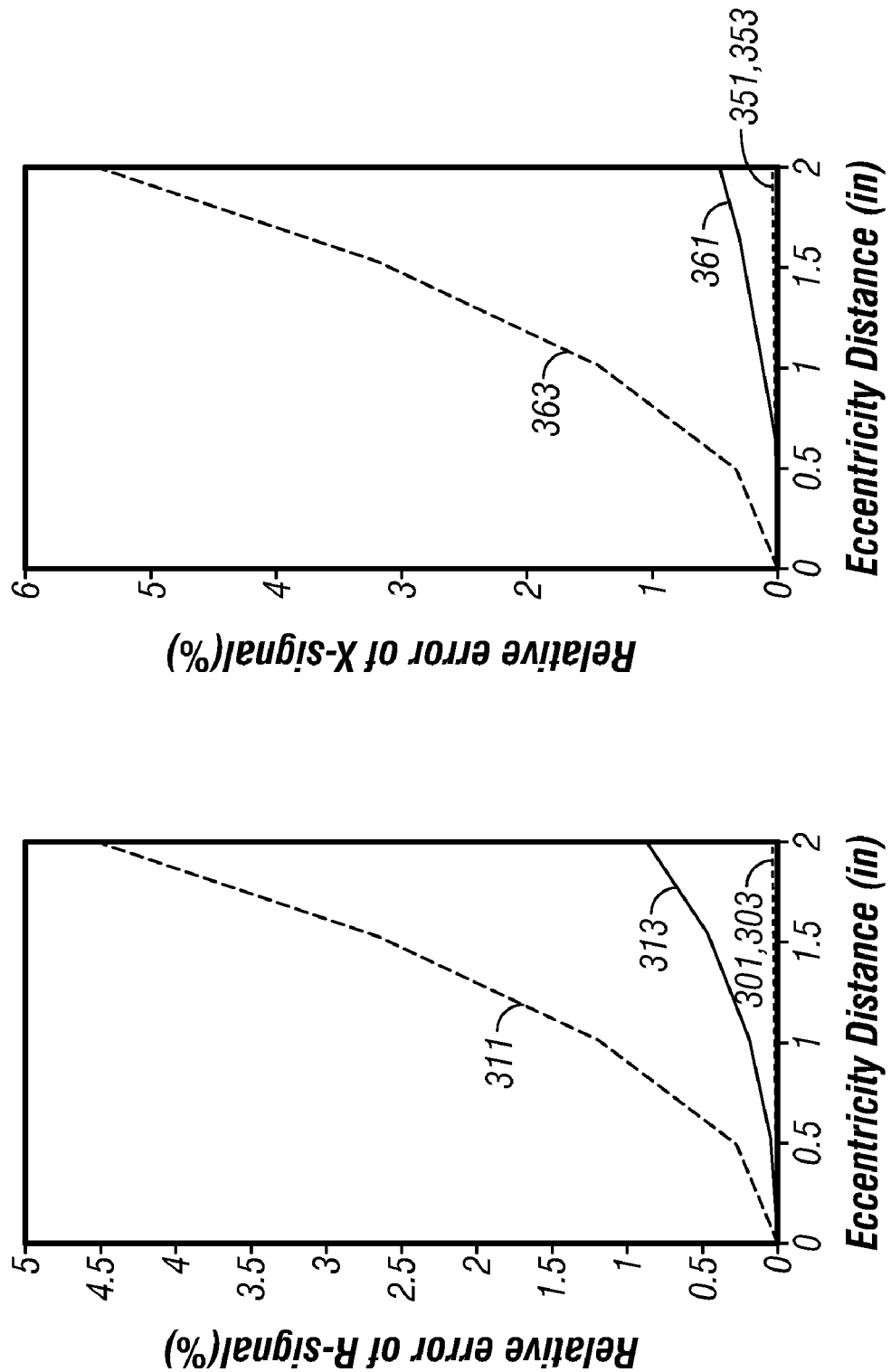
FIG. 3 shows a comparison of eccentricity effect on the XX and YY Components of the R-signals and X-signals at 20 kHz and 220 kHz for conductive formation with $R_h$=2.5 Ω-m and $R_v$=5 Ω-m and the mud resistivity is 0.05 Ω-m. The dip angle is 45 degrees.

FIG. 3 shows the relative errors of the R-signal for the xx component at f1 301 and f10 303 and for the X-signal for the xx component at $f_1$ 351 and $f_{10}$ 353 respectively. It can be seen that the xx component is little affected by tool eccentricity. Both the R-signal and X-signal have small relative errors. At a tool offset of E=2 in., the R-signal delivers less than 0.2% error at 20 kHz and 0.8% error at 220 kHz, while the X-signal also exhibits small errors: 0.1% at 20 kHz and 2.9% at 220 kHz. The single-frequency yy-component is severely affected by eccentricity; we see a dramatic increase of relative errors in both the X- and R-signals. Here, the relative error is defined as the relative difference between the tool response with eccentricity and the tool response without tool eccentricity. 311 and 313 are the R-signal yy component at $f_1$ and $f_{10}$ while 361 and 363 are the X-signal yy component.

Figure 4:
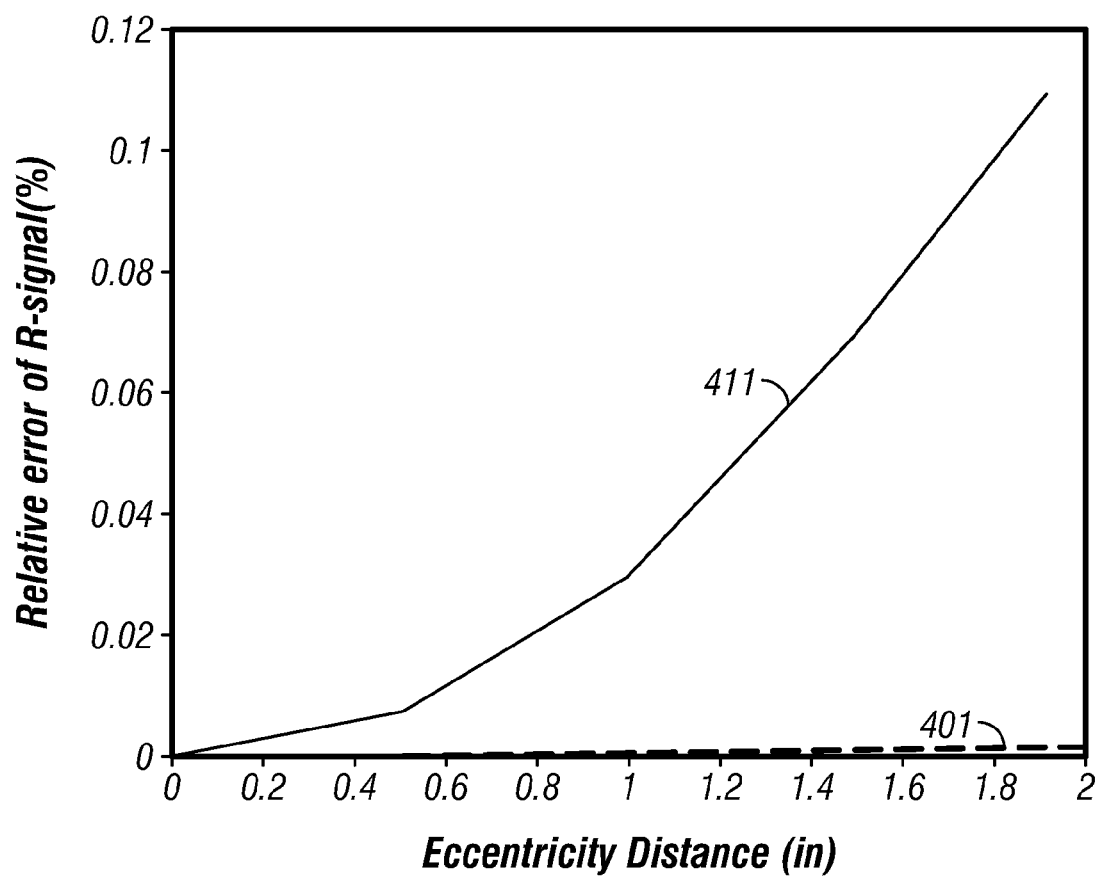
FIG. 4 shows Multifrequency focusing (MFF)-processed R-signal responses in FIG. 3.

After MFF processing, the relative error of the R-signal is reduced to 0.14% for the xx component and 11.6% for the yy component, see FIG. 4. The X-signal (not illustrated) shows similar magnitudes of tool eccentricity effects. This result indicates that both the X-signal and the MFF-processed response reduce the tool eccentricity effect in a similar way.

Figure 5:
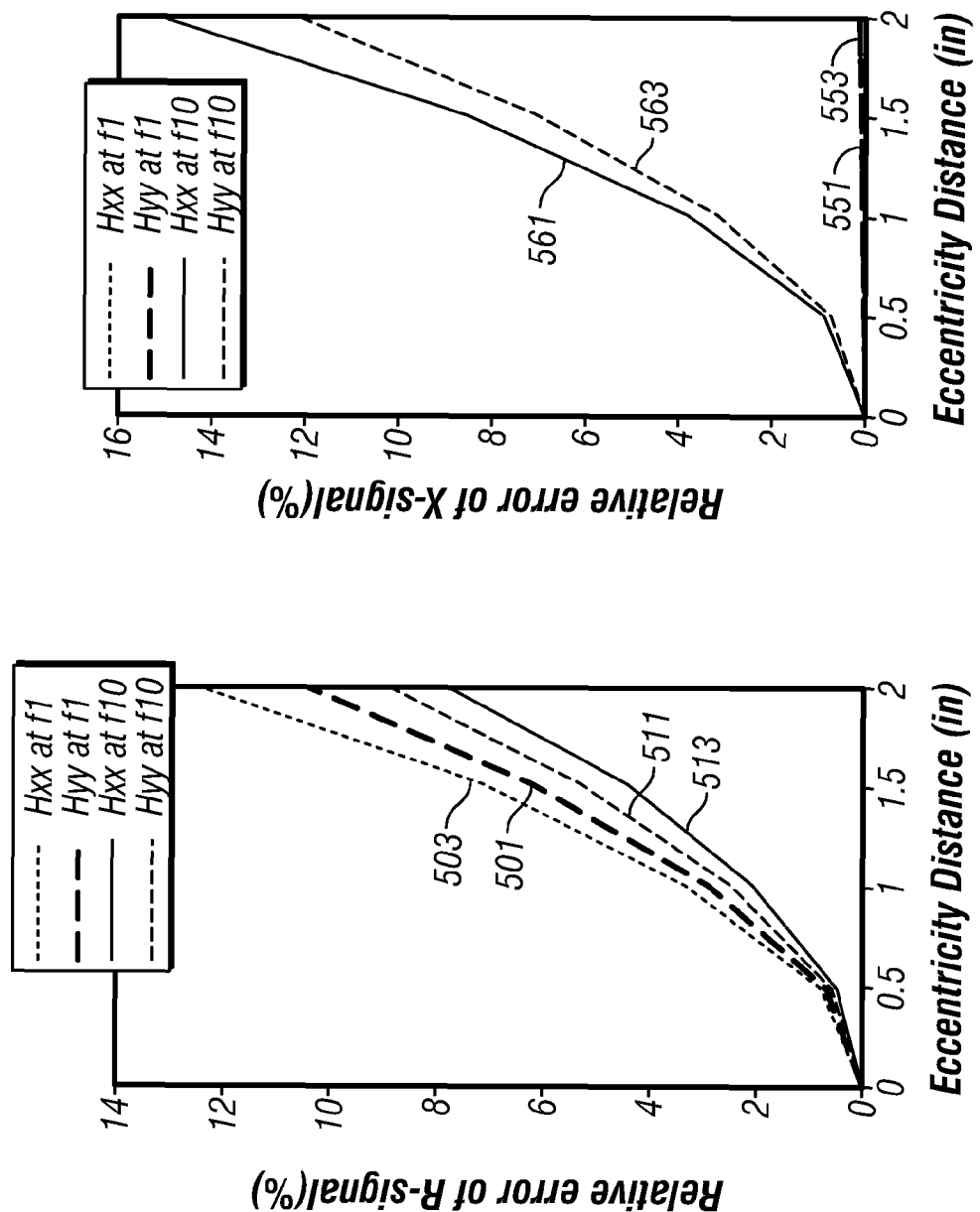
FIG. 5 is the same as FIG. 3 except the formation resistivities are increased; to $R_h$=25 Ω-m and $R_v$=50 Ω-m and the mud resistivity is 0.05 Ω-m. The dip angle is 45 degrees.
Figure 6:
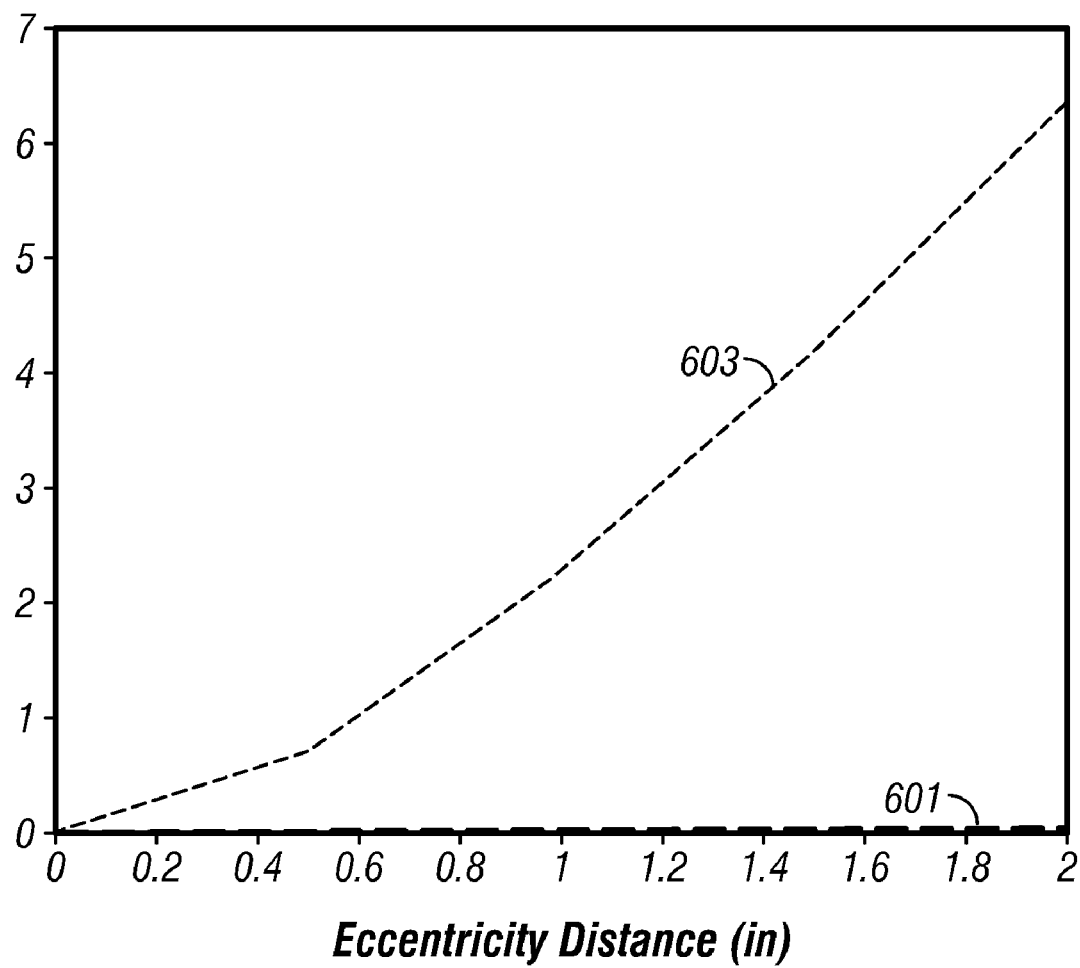
FIG. 6 shows MFF-processed R-signal responses in FIG. 5.

For induction logs, the large eccentricity effect result from highly conductive drilling fluid and highly resistive formations. To demonstrate the effect of a large eccentricity, we increase the resistivity contrast between the formation and mud $R_t/R_m$ from 50 to 500 with $R_h$=25 Ω-m and $R_v$=50 Ω-m. The eccentricity direction now is assumed to be at Φ=45°. All other model parameters are the same as in the previous model. FIG. 5 shows the xx component of the R-signal at $f_1$ 501 and $f_{10}$ 503 and the yy component of the R-signal at $f_1$ 511 and $f_{10}$ 513 respectively. It is clear that both the xx and yy components of the R-signal are largely affected by eccentricity. For the xx component, the relative errors at 2" (5.08 cm) eccentricity are 10.5% and 12.6% at 20 kHz and 220 kHz, respectively. The yy component shows slightly smaller relative errors at the corresponding frequencies. The corresponding curves for the X-component are 551, 553, 561 and 563. FIG. 4 shows that the eccentricity effect may be significantly reduced by the MFF processing FIG. 6. The largest relative error for the xx component 601 is reduced to 0.2%. However, the yy component 603 still has a much larger error. This behavior is similar to the X-signal in FIG. 5 where the xx component has a much less eccentricity effect.

Next, we consider a more complicated case with a layered formation. We are particularly interested in the tool responses near bed boundaries. The layered formation consists of two layers. The layer resistivities are from the previous models. The upper layer has $R_h$=2.5 Ω-m and $R_v$=5 Ω-m. The lower layer has $R_h$=25 Ω-m and $R_v$=50 Ω-m. The relative dip is 45°.

Figure 7:
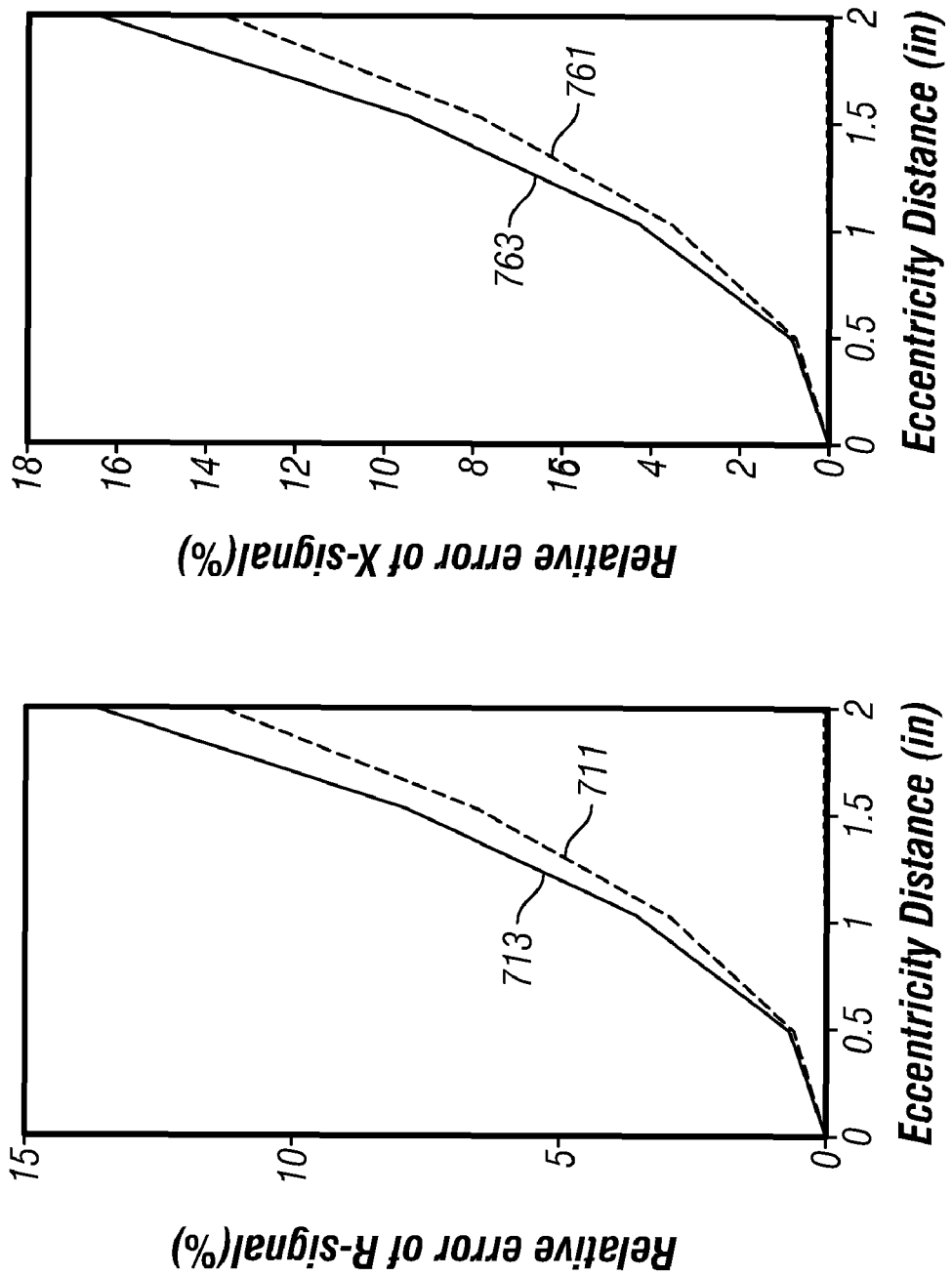
FIG. 7 shows a comparion of eccentricity effect on the xx and yy Components of the R-signals and X-signals at 20 kHz and 220 kHz for a two-layer formation. The upper layer resistivities are $R_h$=2.5 Ω-m and $R_v$=5 Ω-m. The lower layer resistivities are $R_h$=25 Ω-m and $R_v$=50 Ω-m. The dip angle is 45 degrees.

The eccentricity angle is Φ=30°. The transmitter is 2 ft from the layer boundary. Both the R- and X-signals (FIG. 7) have similar tool eccentricity effect to that shown in FIG. 5. Again, the xx component R-signals 701, 703 at $f_1$ and $f_{10}$ and the xx component X-signals 751, 753 show little error. The X-signals are comparable to the MFF-processed R-signals.

Figure 8:
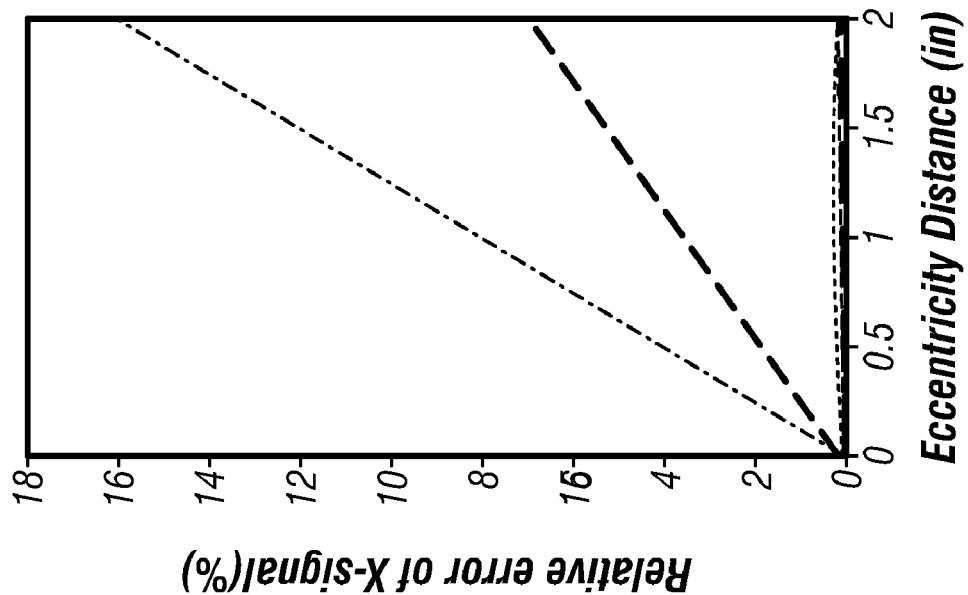
FIG. 8 shows eccentricity effect on the cross components of R-signals and X-signals at 20 kHz for a uniform, anisotropic formation. $R_h$=25 Ω-m, $R_v$=50 Ω-m, and the mud resistivity is 0.05 Ω-m. (Same as in FIG. 5)
Figure 8:
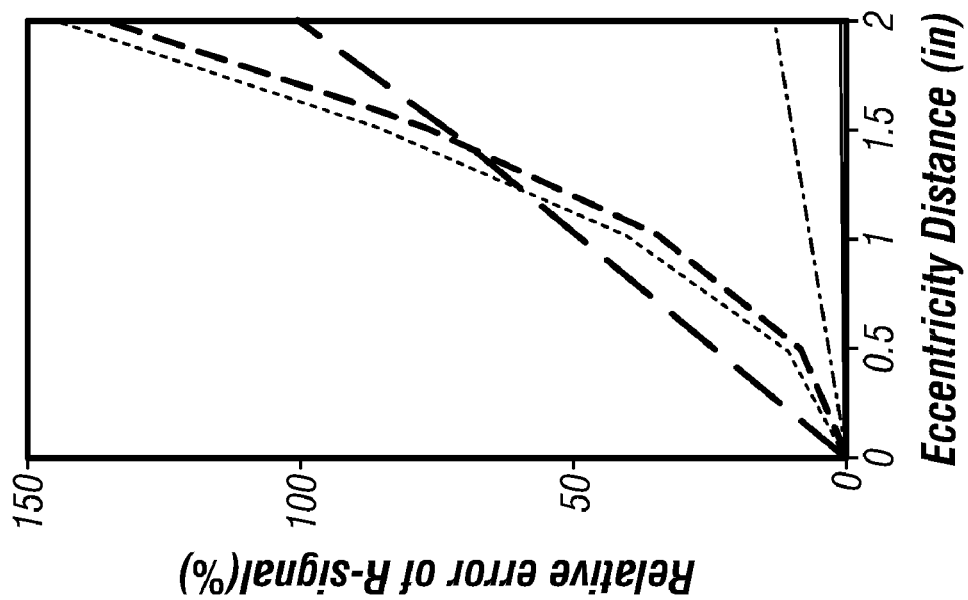
Figure 9:
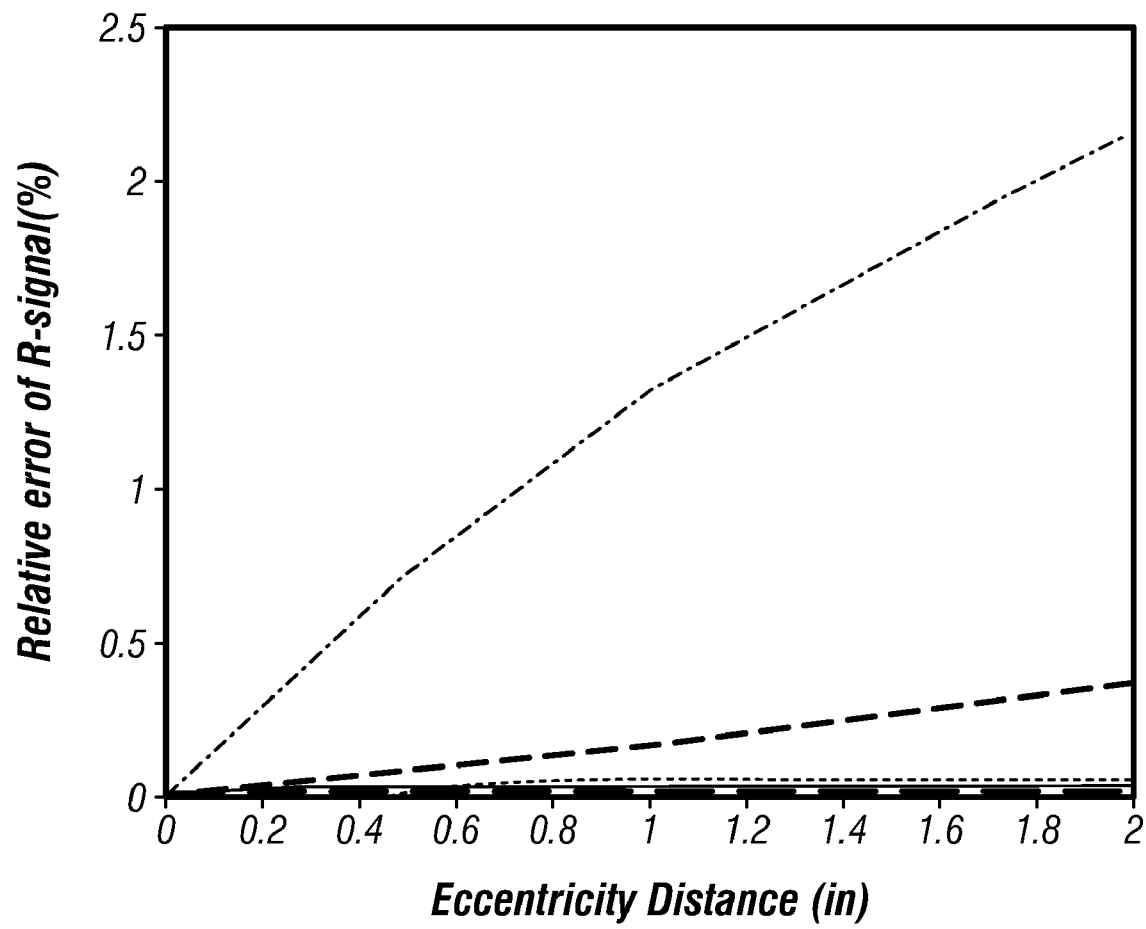
FIG. 9: MFF-processed cross components of the R-signal in FIG. 8.

We further study the eccentricity effect on the cross components of the R-signal and X-signals. As shown in FIG. 8, several cross components of the R-signal are significantly affected by eccentricity. See left hand panel. The purpose of the illustration is to show the dramatic differences between the X-signal and the R-signal for many of the cross-components. The error ranges from over 13% to about 150% for the R-signal. The largest error for the X-signal is only about 16%. The MFF processing does reduce the maximum eccentricity effect to about 2.3% (FIG. 9).

From the previous section, we draw a conclusion that the X-signals are similar to the MFF-processed R-signal in reducing tool eccentricity effect. We anticipate that this feature will hold in the presence of formation anisotropy. Meanwhile, to make use of this, the X-signal must have sufficient sensitivity to formation anisotropy. In the following, we compare the X-signal and the R-signal for sensitivity to anisotropy.

Without loss of generality, we consider only a uniform, anisotropic formation. We fix $R_h$=1 Ω-m and increase the anisotropy ratio, $R_v/R_h$, from 1 to 10. The relative dip angle is 0° (vertical well). We shall examine the normalized signal, $H/H_0$, for various frequencies, where $H_0$ is the response of an isotropic formation.

Figure 10:
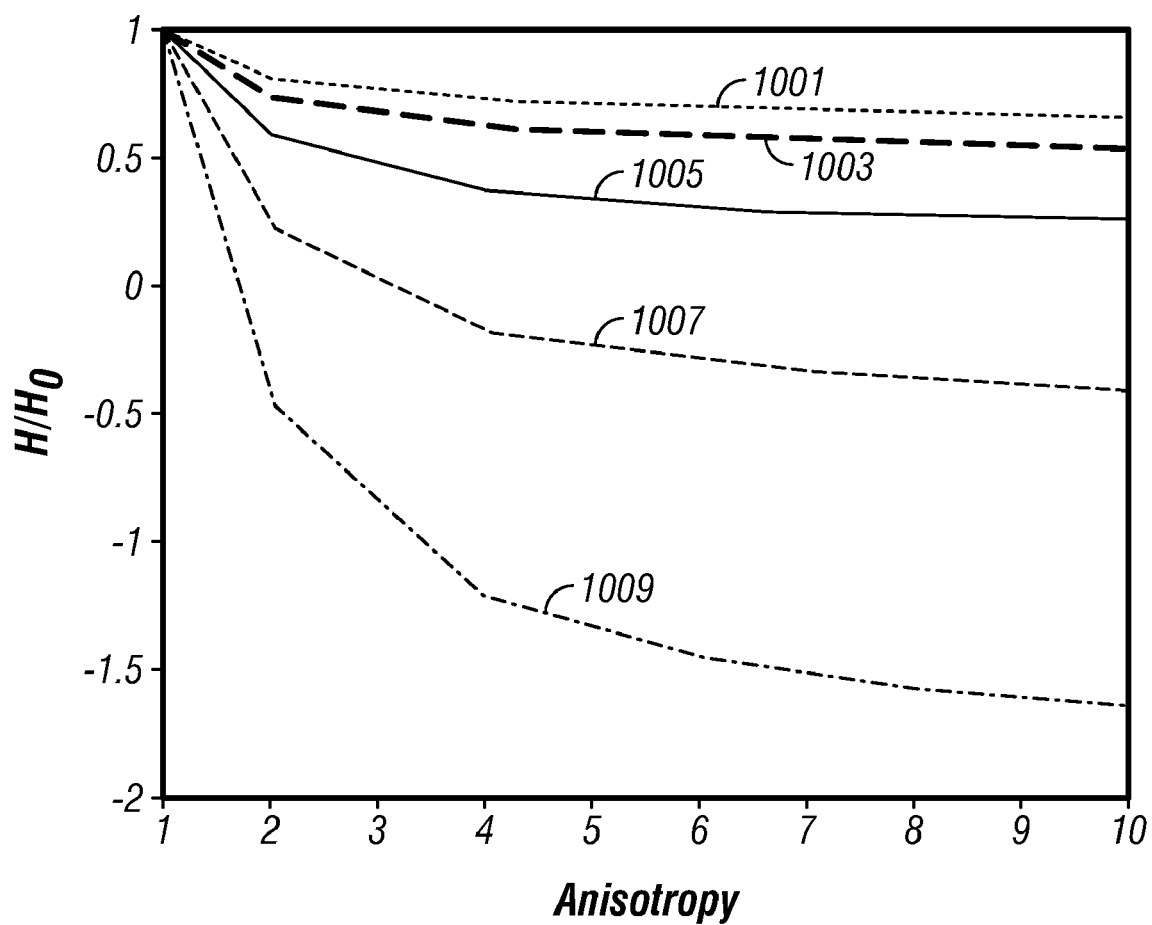
FIG. 10 shows the magnetic field sensitivity to anisotropy for a uniform, anisotropic formation with $R_h$=1 Ω-m. The mud resistivity is 0.05 Ω-m. $f_1$=20 kHz, $f_{10}$=220 kHz.

FIG. 10 shows the xx component of the R- and X-signals for various anisotropy ratios. High anisotropy sensitivity implies that the normalized response (1) changes rapidly as the anisotropy ratio increases and (2) departs significantly from the value of 1. The curve 1001 is the R-signal at 220 kHz, the curve 1003 is the MFF of the R-signal, the curve 1005 is the X-signal at 20 kHz, the curve 1007 is the R-signal at 20 kHz, and the curve 1009 is the X-signal at 220 kHz. It is clear that the X-signals at both 20 kHz and 220 kHz have higher anisotropy sensitivity than the MFF-processed response. Both the X- and R-signals have similar anisotropy sensitivity at 20 kHz, but the X-signal has much higher sensitivity than the R-signal at 220 kHz.

Figure 11:
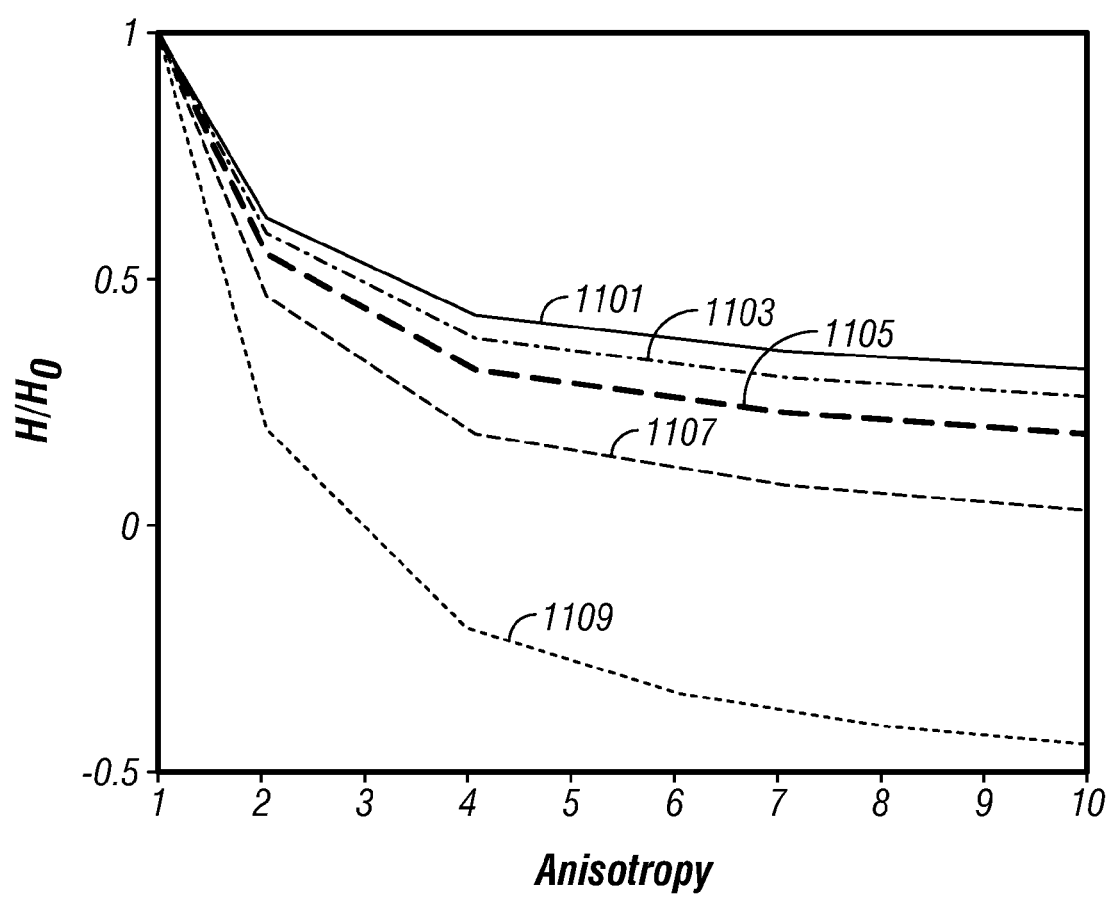
FIG. 11 if the same as FIG. 10 except $R_h$=10 Ω-m.

In FIG. 11, we further test our conclusion with another homogeneous medium with $R_h$=10 Ω-m. The increase the anisotropy ratio, $R_v/R_h$, is from 1 to 10. The relative dip angle is 0 degree (vertical well). The curve 1101 is the X-signal at 20 kHz, the curve 1103 is the X-signal at 220 kHz, the curve 1105 is the MFF of the R-signal, the curve 1107 is the R-signal at 20 kHz and the curve 1109 is the R-signal at 220 kHz. In this case, the X-signal shows similar anisotropy sensitivity to that of the MFF-processed response. It is noted that for this larger-$R_h$ value formation, the R-signal at a high frequency of 220 kHz shows much larger anisotropy sensitivity than the X-signal at the same frequency, whereas in the previous example with $R_h$=1 Ω-m the result is reversed. This observation indicates that it would be beneficial to combine the X-signal and the R-signal in resolving anisotropic formations with various $R_h$ levels.

Figure 12:
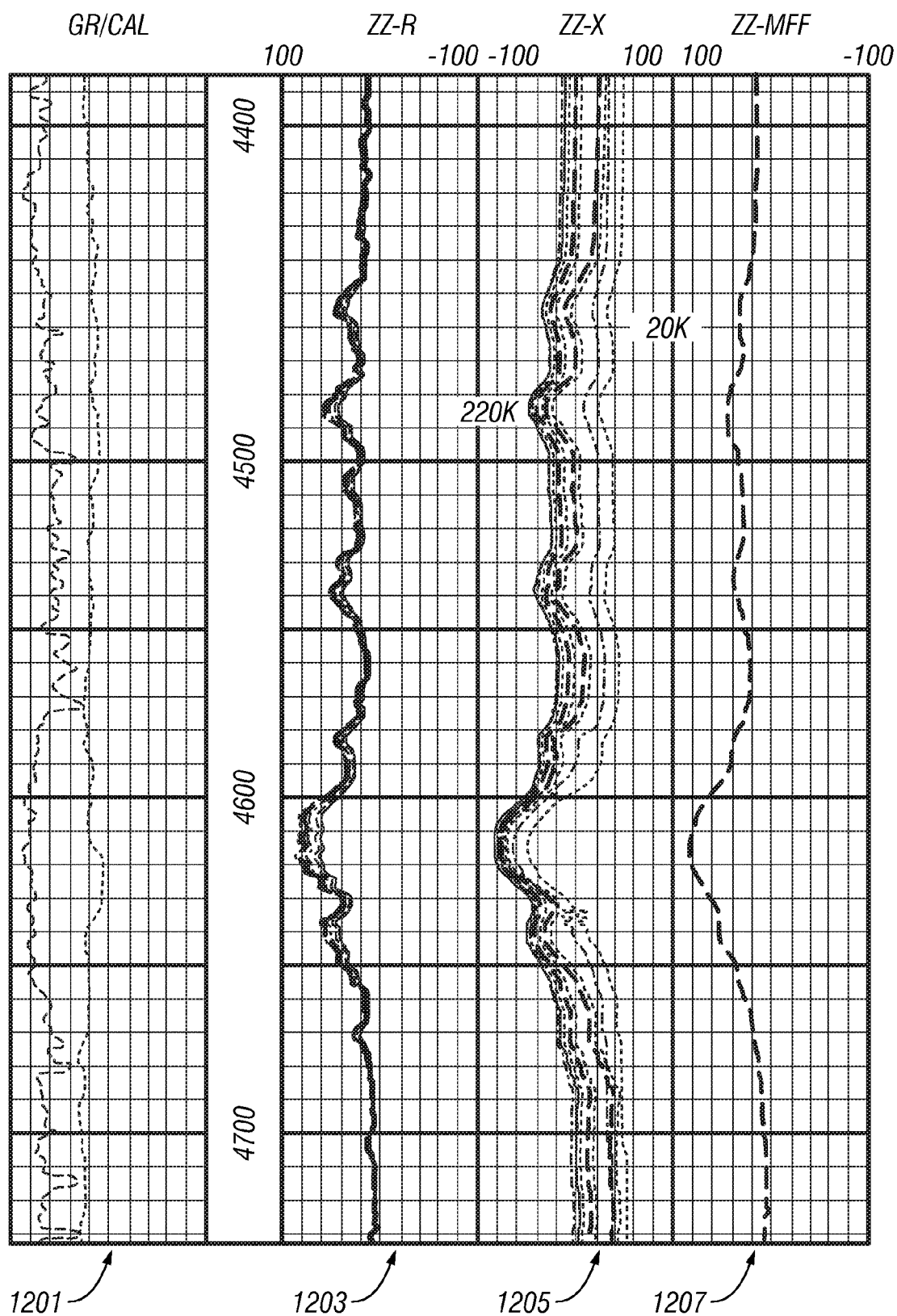
FIG. 12 shows the zz component conductivity curves from an exemplary well near Odessa, Tex. The X-signal has similar features to the MFF-processed response, especially at higher frequencies.

FIG. 12 shows data from a test well near Odessa, Tex. The tool was pushed off the borehole center with bow springs to test an eccentricity correction method. Consequently, significant tool eccentricity effect was expected. FIG. 12 shows the zz-component single-frequency and MFF-processed conductivity curves. Track 1 1201 shows that gamma ray and the caliper logs. Because the formation resistivity is relatively high, the skin effect is small, leaving little separation between the single-frequency curves. See track 2 1203. The MFF-processed response track 4 1205 resembles the single frequency responses except the latter has higher resolution. The X-signals have very similar pattern to the MFF response, especially at higher frequencies. See track 3 1205. The 220-kHz X-signal displays close similarity to the MFF data for the R-signal. The zz-component is little affected by tool eccentricity.

Figure 13:
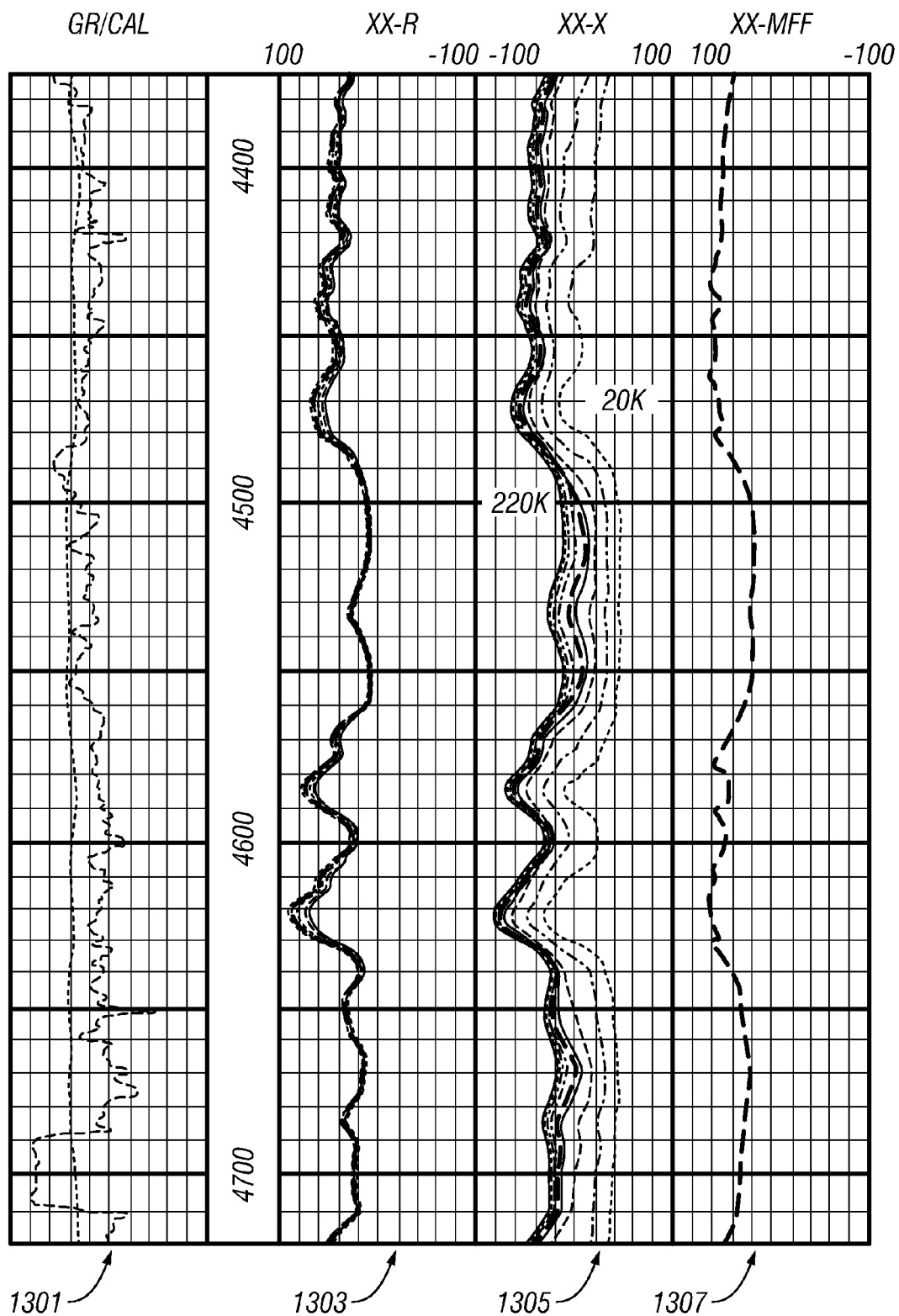
FIG. 13 shows the xx component conductivity from the Odessa Well. Notice that the processing artifacts cause the MFF response to be erroneous at depth intervals of x4430-4480, x4580-4630.

Because the tool was pushed in the x-direction, the xx-component log should have minimal eccentricity effect, as discussed above. This is observed in FIG. 13. Track 1 1301 shows the gamma ray and caliper logs. The magnitudes of all the curves are similar to those for the zz-component in FIG. 12. Again, as in the modeling simulations, the X-signals track 3 1303 have similar features to the MFF response 1307. However, processing artifacts may cause the MFF response to be erroneous. Notice the differences between the X-signal response and the MFF response at depth intervals of x4430-4480, x4580-4630. The X-signal response shows closer correlation with the single-frequency R-signals, whereas the MFF response demonstrates apparently unexplainable features. The apparently unexplainable features were caused by shifts in the number of terms used in the MFF processing. 1303 shows the R-signal xx component.

Figure 14:
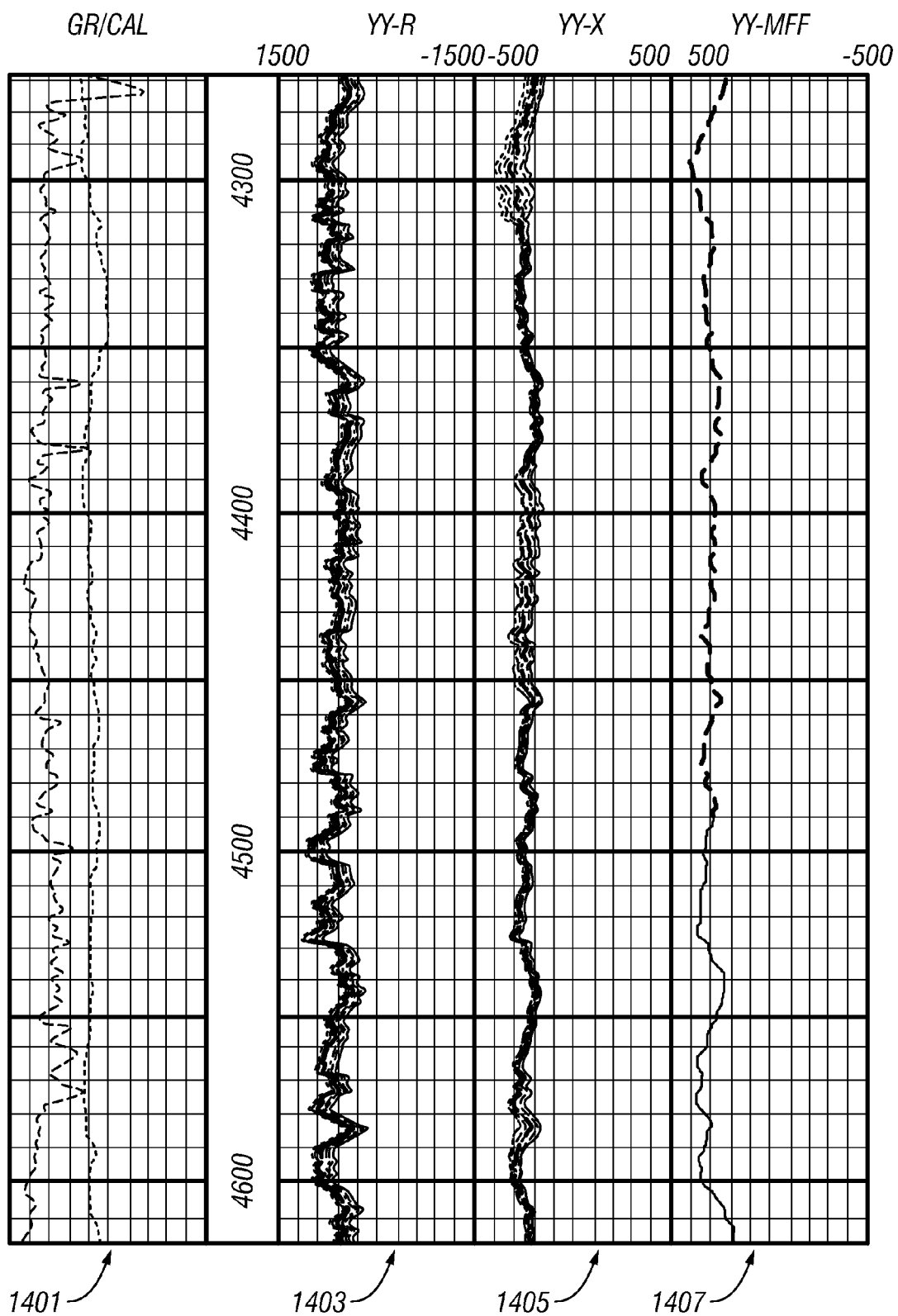
FIG. 14 shows the yy component conductivity curves for the Odessa Well. The yy component is much more affected by tool eccentricity than the xx and zz components.

Because the tool was decentralized in the x-direction, the yy component will have a large eccentricity effect. The logs shown in FIG. 14 indicate that the single-frequency R-signals 1403 have a magnitude that is about three times as big as that of the MFF response 1407. On the other hand, the single-frequency X-signals 1405 have the same magnitude as that of the MFF response. The detailed features in the MFF response and the X-signals are also similar. This indicates that, as discussed above with reference to the simulation results, the X-signal is similar or equivalent to the MFF response. Notice that both the MFF response and the X-signal is several times stronger than the corresponding xx-component response.

To summarize the examples above, we conclude that: The synthetic and field data examples show that the X-signal closely resembles the MFF response. Both are effective in reducing near zone effects including eccentricity effect. The X-signal has similar or better sensitivity to formation anisotropy than the MFF response. Observation of the field data leads us to the important conclusion that the X-signal is not detrimentally affected by coil bucking errors, although the X-signal may be more subject to such errors than the R-signal. This important observation suggests that the X-signal may be practically used as a deep-response measurement. Moreover, the single frequency X-signal with high resolution shows more formation features compared to filtered R-signal MFF data. Like the R-signal response, the X-signal response is subject to the skin effect that must be corrected.

Using the X-signal, it is thus possible to determine the horizontal and vertical resistivities of the earth formation. A convenient way of doing the determination is to use a table lookup. It should be noted that while the description has been with reference to field components in the x-, y- and z-directions, comparable results can be obtained using transmitters and receivers with other alignments and performing a coordinate rotation. Once the horizontal and vertical resistivities of the earth formation are determined, petrophysical parameters of the formation may be determined. These include sand and shale fractions, water saturation, and, in combination with NMR measurements, permeability. See, for example, U.S. Pat. No. 6,493,632 to Mollison et al., and U.S. Pat. No. 6,686,736 to Schoen et al., having the same assignee as the present disclosure and the contents of which are incorporated herein by reference. The method may also be used in reservoir navigation (see the deep-response noted in paragraph 0038) wherein drilling direction is controlled to maintain a desired trajectory in an earth formation at a specified relation to an interface.

Implicit in the processing of the data is the use of a computer program on a suitable machine-readable medium that enables the processor to perform the control and processing. The machine-readable medium may include ROMs, EPROMs, EEPROMs, Flash Memories and Optical disks The method of the present disclosure has been discussed above with reference to a logging device conveyed on a wireline. However, the method of the disclosure is equally applicable to logging devices conveyed on a bottomhole assembly for measurement-while-drilling (MWD) applications.

It should further be noted that the method of the present disclosure has been given using examples of a single frequency, measurement of the real component of the magnetic field. The method of the present disclosure could also be used with dual or multiple frequencies, real component measurements.

What is claimed is:

1. A method of logging of an earth formation, the method comprising:
   (a) positioning a logging tool in an eccentered position in a borehole;
   (b) transmitting a first magnetic field into the earth formation;
   (c) receiving a component of a magnetic field resulting from the first transmitted magnetic fields, the received component having a phase substantially the same as a phase of the first transmitted magnetic field;
   (d) processing the received component to estimate a resistivity property of the earth formation, the estimate being substantially unaffected by an amount of the eccentering; and
   (e) recording the estimated resistivity property on a suitable medium.

2. The method of claim 1 wherein an axis of the transmitted magnetic field is one of (i) substantially parallel to an axis of the tool, and (ii) substantially orthogonal to an axis of the tool.

3. The method of claim 1 wherein an axis of the received magnetic field is one of (i) substantially parallel to an axis of the tool, and (ii) substantially orthogonal to an axis of the tool.

4. The method of claim 1 wherein the earth formation is anisotropic and the estimated resistivity property further comprises a horizontal resistivity and a vertical resistivity.

5. The method of claim 4 further comprising using the estimated resistivity property to determine a petrophysical property of the formation, the petrophysical property being selected from (i) a water saturation, (ii) a sand fraction, (iii) a shale fraction, and (iv) a permeability.

6. The method of claim 1 further comprising using the estimated resistivity property control a direction of drilling.

7. The method of claim 1 further comprising:
   (i) receiving an additional component of the magnetic field resulting from the first transmitted magnetic field, the additional component having a phase substantially in quadrature with a phase of the first transmitted magnetic field;
   (ii) using the additional received component to estimate the resistivity property of the earth formation, the estimate being substantially unaffected by an amount of eccentering.

8. The method of claim 1 further comprising transmitting the first magnetic field at a single frequency.

9. The method of claim 1 further comprising conveying logging tool into the borehole on one of: (i) a wireline, and (ii) a drilling tubular.

10. An apparatus for logging of an earth formation, the apparatus comprising:
    (a) a logging tool configured to be positioned in an eccentered position in a borehole;
    (b) a transmitter configured to transmit a first magnetic field into the earth formation;
    (c) a receiver configured to receive a component of magnetic field resulting from the first transmitted magnetic field, the received component having a phase substantially the same as a phase of the first transmitted magnetic field; and
    (d) a processor configured to:
       (A) process the received component to estimate a resistivity property of the earth formation, the estimate being substantially unaffected by an amount of the eccentering; and
       (B) record the estimated resistivity property on a suitable medium.

11. The apparatus of claim 10 wherein an axis of the transmitter is one of (i) substantially parallel to an axis of the tool, and (ii) substantially orthogonal to an axis of the tool.

12. The apparatus of claim 10 wherein an axis of the receiver is one of (i) substantially parallel to an axis of the tool, and (ii) substantially orthogonal to an axis of the tool.

13. The apparatus of claim 10 wherein the earth formation is anisotropic and the estimated resistivity property further comprises a horizontal resistivity and a vertical resistivity.

14. The apparatus of claim 13 wherein the processor is further configured to use the estimated resistivity property to determine a petrophysical property of the formation, the petrophysical property being selected from (i) a water saturation, (ii) a sand fraction, (iii) a shale fraction, and (iv) a permeability.

15. The apparatus of claim 10 wherein the processor is further configured to use the estimated resistivity property control a direction of drilling.

16. The apparatus of claim 10 further wherein the first receiver is further configured to receive an additional component of the magnetic field resulting from the first transmitted magnetic field, the additional component having a phase substantially in quadrature with a phase of the first transmitted magnetic field;
    and wherein the processor is further configured use the additional component to estimate the resistivity property of the earth formation, the estimate being substantially unaffected by an amount of eccentering.

17. The apparatus of claim 10 wherein the transmitter is further configured to transmit the first magnetic field at a single frequency.

18. The apparatus of claim 10 further comprising a conveyance device configured to convey logging tool into the borehole, the conveyance device selected from: (i) a wireline, and (ii) a drilling tubular.

19. The apparatus of claim 10 further comprising an additional transmitter configured to generate a second magnetic field into the earth formation, an axis of the additional transmitter being inclined to an axis of the transmitter.

20. The apparatus of claim 10 further comprising an additional receiver having an axis inclined to an axis of the receiver.

21. A computer readable medium for use with an apparatus for logging of an earth formation, the apparatus comprising:
   (a) a logging tool configured to be positioned in an eccentered position in a borehole;
   (b) a transmitter configured to transmit a first magnetic field into the earth formation; and
   (c) a receiver configured to receive a component of magnetic field resulting from the first transmitted magnetic fields, the received component having a phase substantially the same as a phase of the first transmitted magnetic field;

the medium comprising instructions which enable a processor to:
   (d) process the received component to estimate a resistivity property of the earth formation, the estimate being substantially unaffected by an amount of the eccentering; and
   (e) record the estimated resistivity property on a suitable medium.

22. The medium of claim 21 further comprising at least one of (i) a ROM, (ii) an EPROM, (iii) an EAROM, (iv) a flash memory, and (v) an optical disk.

* * * * *